United States Patent Office 3,039,889
Patented June 19, 1962

3,039,889
WATER-RESISTANT NONFIBROUS REGENERATED CELLULOSE FILM AND PROCESS OF PRODUCING SAME
Gerald I. Keim, West Grove, Pa., assignor to Hercules Powder Company, Wilmington, Del., a corporation of Delaware
No Drawing. Filed Mar. 12, 1958, Ser. No. 720,812
1 Claim. (Cl. 117—72)

This invention relates to the treatment of nonfibrous regenerated cellulose film to improve the bonding of said film to the subsequently applied topcoat.

Non fibrous regenerated cellulose films have found utility in the packaging of various products to protect them against the deleterious effects of atmospheric moisture. To adapt them for this use, such films are conventionally provided with a water-repellent topcoat adhesively secured thereto by a suitable anchoring agent. One of the frequent disadvantages encountered in the use of these treated films for the indicated purpose is that the anchoring agent breaks down after a period of exposure to moist atmospheric conditions, particularly at higher relative humidities. As a result, the adhesive bond between the nonfibrous regenerated film and the water-repellent topcoat is weakened or broken, thereby permitting the entry of moisture into the package with consequent adverse effects on the packaged product.

A principal object of the present invention is the provision of a process for anchoring nonfibrous regenerated cellulose film to a water-repellent topcoat whereby a film having prolonged resistance to moisture and moisture vapor transmission is obtained.

A further and more specific object of the invention is the provision of a film of the indicated type wherein the nonfibrous regenerated cellulose film is anchored to the water-repellent topcoat by a novel and highly effective anchoring agent.

Another object of the invention is the provision of an anchor coating for nonfibrous regenerated cellulose film having greater tenacity and durability than prior art anchor coatings, which may be obtained in a shorter time of immersion in a bath or by spray and which, when dried, furnishes a nonblocking, heat-sealable film that retains its original dimensional stability, flexibility and appearance after coating.

In accordance with the invention, the above and other objects are accomplished by utilizing as the anchoring agent a thermosetting cationic resin comprising a water-soluble polymeric reaction product of epichlorohydrin and a polyamide derived from a polyalkylene polyamine and a $C_3$–$C_{10}$ saturated aliphatic dicarboxylic acid.

In carrying out the process of the invention, an aqueous solution of the cationic resin may be applied to a nonfibrous regenerated cellulose film, as by dipping or spraying, and the treated film then dried by any of the commercially available methods of drying such as by passing it over hot rolls or through heated tunnels or by exposure to infrared lamps, etc. Alternatively, since the cationic resin utilized herein is compatible with and soluble in a viscose solution, it may be incorporated in the film during manufacture thereof as by adding an aqueous solution of the resin to the viscose solution. After the film has been dried, a moisture-resistant topcoat is applied in the usual manner.

The aqueous resin solutions contemplated for use herein are dilutable to any desired concentration in water. Hence, they may be applied to nonfibrous regenerated cellulose film at any desired or convenient concentration. From an economic standpoint, it is desirable to use these resins in solutions varying from about 0.1% to about 10%. However, if it is desired, for example, to decrease the time required for cure, the resin solution may be increased in solids to about 40% provided it is used promptly, i.e., within about an hour after such concentration.

The amount of resin in or on the film will vary depending on the degree of anchoring desired and other factors. In some cases, as little as 1.0% by weight, based on the weight of the film, will suffice. In other cases, more or less may be desirable. In general, amounts above about 10.0% afford little, if any, added advantage and, hence, will not ordinarliy be used. The figures given are intended to serve as a guide and should not be construed as limiting the scope of the invention since the amount needed for a particular application is readily determinable by one skilled in the art.

The resins herein disclosed are highly cationic and, when added to a viscose solution and the latter then processed into film, are largely retained by the cellulose and carried through into the finished film. Some losses, however, are inevitable and allowance should be made for these when this procedure is utilized.

In the processing of unplasticized nonfibrous regenerated cellulose film, it is conventional practice to treat the film with glycerin or other polyol plasticizer commonly used for this purpose. The aqueous resin solutions of the present invention are compatible with such plasticizers in all proportions and, hence, the two may be mixed together and applied to, or incorporated in, the film in one step. Such resins, moreover, do not precipitate from the glycerol or like application bath in the presence of inorganic salts carried over from the acid regeneration bath.

In the preparation of the cationic thermosetting resins contemplated for use herein, the dicarboxylic acid is first reacted with the polyalkylene polyamine under conditions such as to produce a water-soluble polyamide containing the recurring groups

—NH($C_nH_{2n}$HN)$_x$—CORCO— where $n$ and $x$ are each 2 or more and R is the divalent hydrocarbon radical of the dicarboxylic acid. This water-soluble polyamide is then reacted with epichlorohydrin to form the water-soluble cationic thermosetting resin.

The dicarboxylic acids contemplated for use in preparing these resins are the $C_3$–$C_{10}$ saturated aliphatic dicarboxylic acids such as succinic, glutaric, adipic and the like. The saturated dicarboxylic acids having from 4 to 8 carbon atoms in the molecule are preferred. Blends of two or more of the saturated dicarboxylic acids may also be used.

A variety of polyalkylene polyamines including polyethylene polyamines, polypropylene polyamines, polybutylene polyamines and so on may be employed of which the polyethylene polyamines represent an economically preferred class. More specifically, the polyalkylene polyamines contemplated for use may be represented as polyamines in which the nitrogen atoms are linked together by groups of the formula —$C_nH_{2n}$— where $n$ is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, dipropylenetriamine and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia and ethylenediamine, is a very satisfactory starting material. The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amino groups on the polyamide molecule in order to change the reactivity of the polyamide—epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by a molecularly equivalent amount of the diamine. Usually, a replacement of about 50% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products when reacted with epichlorohydrin, do not produce resins having the desired efficiency for use herein.

In converting the polyamide, formed as above described, to a cationic thermosetting resin, it is reacted with epichlorohydrin at a temperature from about 45° C. to about 100° C. and preferably between about 45° C. and 70° C. until the viscosity of a 20% solids solution at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction it may be desirable, in some cases, to add alkali to combine with at least some of the acid formed.

When the desired viscosity is reached, sufficient water is then added to adjust the solids content of the resin solution to the desired amount, i.e., about 10% more or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product. However, hydrochloric acid is preferred.

In the polyamide-epichlorohydrin reaction, it is preferred to use sufficient epichlorohydrin to convert all secondary amine groups to tertiary amine groups. However, more or less may be added to moderate or increase reaction rates. In general, satisfactory results may be obtained utilizing from about 0.5 mole to about 1.8 moles of epichlorohydrin for each secondary amine group of the polyamide. It is preferred to utilize from about 1.0 mole to about 1.5 moles for each secondary amine group of the polyamide.

The following examples will serve to illustrate the invention. In these examples, the cationic water-soluble thermosetting polyamide-epichlorohydrin resin utilized was prepared as follows.

0.97 mole of diethylene triamine and sufficient water for slurry were placed in a flask equipped with a mechanical stirrer, thermometer and condenser. To this was added 1.0 mole of adipic acid. After the acid had dissolved in the amine, the solution was heated to 195° C. and held there for 1½ hours. The mixture was then cooled under atmospheric pressure to 140° C., and sufficient water added so that the resulting solution contained approximately 50% solids.

To a given amount of the above polyamide solution, sufficient water was added to lower the percent solids to approximately 25%. This solution was heated to 50° C., and an amount of epichlorohydrin sufficient to give a ratio of 1.15 moles of epichlorohydrin to 1 mole of secondary amine in the polyamide, was added dropwise over a period of 10–15 minutes. The contents of the flask were then heated at a temperature of 60–70° C. until it had attained a Gardner viscosity of D–E. Sufficient water was then added to the product to achieve a percent solids of approximately 10% and it was cooled to 25° C. Sufficient 10% HCl was added to adjust the pH to 5.0–5.5. The final product contained 9.6% solids and had a Gardner viscosity of C–D.

*Example 1*

An aqueous solution of the cationic polyamide-epichlorohydrin resin, prepared as above described, and containing 9.6% solids was applied to plasticized cellophane by means of conventional spray equipment and dried in a forced draft oven at 90° C. After 15 minutes' drying time, the film was unwrinkled, nontacky, nonblocking, transparent and lustrous. Spraying was done to both sides in such a way that a film thickness of 0.1 mil (0.0001 inch) of dried coating was obtained.

The film was subsequently sprayed with a nitrocellulose-based coating similar to that described in U.S. Patent 2,236,546 and dried for 30 minutes at 66° C. A film thus prepared was immersed in water. Similarly, a film with no anchor coating, but bearing the nitrocellulose coating, was immersed in water. The film bearing both the cationic resin-anchor coat, and nitrocellulose coat, remained unchanged after four weeks' immersion, whereas the film to which no anchor coat and a nitrocellulose lacquer had been applied blushed badly after only 1 hour. The tensile properties of the resin-coated film were the same as those of an uncoated, plasticized cellophane.

*Example 2*

A plasticized untreated cellophane film was dip coated in a 9.6% solids water solution of the cationic resin, prepared as above described, for 2 minutes, allowed to drain and the film then heated for 2 hours under a pressure of 10 mm. of Hg at 65° C. Films which had been so treated and subsequently sprayed with a protective moisture-resistant nitrocellulose lacquer coating and dried, as in Example 1, possessed a moisture vapor transmission rate of 4.2–4.9 g./24 hrs./sq. m., whereas films which had received no anchor coating but had received a spray coating of nitrocellulose lacquer, possessed a moisture vapor transmission of 6–8 g./24 hrs./sq. m.

*Example 3*

The procedure outlined in Example 1 was followed except that a 9.6% solids aqueous solution of the cationic resin and 10% by weight, based on the weight of solution of cationic resin, of glycerin was applied by means of spray equipment to unplasticized cellophane. After prolonged immersion, the film bearing both the resin-anchor coat and the nitrocellulose coat remained unchanged.

*Examples 4 and 5*

The procedure of Example 3 was followed except that the aqueous solution contained 1% of the cationic resin and 20% of glycerin (Example 4) and 0.3% of the cationic resin and 6% of glycerin (Example 5). In each case, the results obtained were comparable to those obtained in Examples 1 and 3.

*Example 6*

The procedure of Example 1 was followed except the aqueous solution contained 9.6% resin plus 10% glycerin and application to unplasticized cellophane was made by dip coating and the use of "nip" rolls so that the applied coating was approximately 0.1 mil thick after curing. The results obtained were comparable to those obtained in the preceding examples.

*Examples 7 and 8*

The procedure of Example 6 was followed except that the aqueous solution contained 1% resin and 20% glycerin (Example 7) and 0.3% resin and 6% glycerin (Example 8). The results were comparable to those previously obtained.

The time of immersion required for dip coating procedures such as those utilized in Examples 6 to 8 is relatively short, being of the order of from about 1 minute to about 5 minutes. For resin film thicknesses less than about 0.1 mil, i.e., of the order of 0.01 mil or less, somewhat shorter periods of immersion may be utilized.

Any of the well-known water-repellent coating compositions or lacquers which are applied to regenerated cellulose films may be utilized herein. Customarily such lacquers comprise a film-former such as cellulose nitrate, ethyl cellulose, chlorinated rubber, etc., a plasticizer for the film-former, a moistureproofing agent such as paraffin wax, a blending agent, volatile solvents, etc. Examples of typical moistureproofing compositions may be found in U.S. 1,737,187 (Charch and Prindle), U.S. 1,997,583 (Hitt), U.S. 2,079,379 (Mitchell), U.S. 2,079,395 (Bradshaw), U.S. 2,147,180 (Ubben), U.S. 2,236,546 (Mitchell), etc.

What I claim and desire to protect by Letters Patent is:

A nonfibrous regenerated cellulose film having improved resistance to moisture and moisture vapor transmission, said film having a water-repellent nitrocellulose-based coating bonded thereto by a dried cationic thermosetting resin, said resin being obtained by reacting a polyalkylene polyamine having two primary amine groups and at least one secondary amine group with a $C_3$–$C_{10}$ saturated aliphatic dicarboxylic acid at a temperature from about 110° C. to about 250° C. and in a mole ratio of polyalkylene polyamine to dicarboxylic acid of from about 0.8 to 1 to about 1.4 to 1 to form a water-soluble long-chain polyamide containing secondary amine groups, and then reacting the polyamide in aqueous solution with epichlorohydrin at a temperature from about 45° C. to about 100° C. and in a mole ratio of epichlorohydrin to secondary amine groups of said polyamide of from about 0.5 to 1 to about 1.8 to 1.

References Cited in the file of this patent

UNITED STATES PATENTS

| | | |
|---|---|---|
| 2,573,956 | Daniel et al. | Nov. 6, 1951 |
| 2,630,397 | Cowan et al. | Mar. 3, 1953 |
| 2,926,154 | Keim | Feb. 23, 1960 |

FOREIGN PATENTS

| | | |
|---|---|---|
| 610,311 | Great Britain | Oct. 14, 1948 |
| 529,729 | Canada | Aug. 28, 1956 |

OTHER REFERENCES

Ser. No. 323,512, Hagedorn (A.P.C.), published April 20, 1943.